(12) United States Patent
Tseng

(10) Patent No.: US 8,926,312 B2
(45) Date of Patent: Jan. 6, 2015

(54) DETACHABLE THREADED ROD FOR USE IN A MOLD

(71) Applicant: Hon Hai Precision Industry Co., Ltd., New Taipei (TW)

(72) Inventor: Min-Tsang Tseng, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/923,272

(22) Filed: Jun. 20, 2013

(65) Prior Publication Data
US 2014/0178524 A1    Jun. 26, 2014

(30) Foreign Application Priority Data
Dec. 26, 2012   (TW) ................................. 101150296

(51) Int. Cl.
*B29C 45/40*   (2006.01)
*B29C 45/17*   (2006.01)

(52) U.S. Cl.
CPC .......... B29C 45/1742 (2013.01); *Y10S 425/808* (2013.01)
USPC .............................. 425/438; 249/59; 425/808

(58) Field of Classification Search
USPC .................... 425/192 R, 438, 808; 249/59
See application file for complete search history.

(56) References Cited

U.S. PATENT DOCUMENTS 3,856,255 A * 12/1974 Holzmann ........................ 249/59
4,958,676 A *  9/1990 Kuntz ............................. 164/340

FOREIGN PATENT DOCUMENTS

EP            0113303       *  7/1984

* cited by examiner

*Primary Examiner* — Tim Heitbrink
(74) *Attorney, Agent, or Firm* — Novak Druce Connolly Bove + Quigg LLP

(57) ABSTRACT

A detachable threaded rod is used in an injection mold, and includes an operation portion, a molding portion, and a screw. The operation portion includes a rod part, the rod part defines a mating hole and a screw hole on a bottom surface of the mating hole. The molding portion includes a front end, a rear end, and a side surface connected between the front end and the rear end. The molding portion defines a cavity on a front end. The molding portion includes a mating portion extending from the rear end and received in the mating hole. The mating portion defines a through hole communicating with the cavity. The molding portion defines external threads on the side surface. The screw penetrates the through hole and screwing in the screw hole, the operation portion is fixed with the molding portion by the screw.

9 Claims, 4 Drawing Sheets

DETACHABLE THREADED ROD FOR USE IN A MOLD

BACKGROUND

1. Technical Field

The present disclosure relates to molds and, particularly, to a detachable threaded rod for use in a mold.

2. Description of Related Art

Molds may include a threaded rod to mold internal threads in workpieces. To mold different sizes of internal threads, the fully threaded rod needs to be replaced with another suitable one, which is complicated.

Therefore, it is desirable to provide a detachable threaded rod, which can overcome the limitations described.

DETAILED DESCRIPTION

Embodiments of the disclosure will be described with reference to the drawings.

Figure 1:
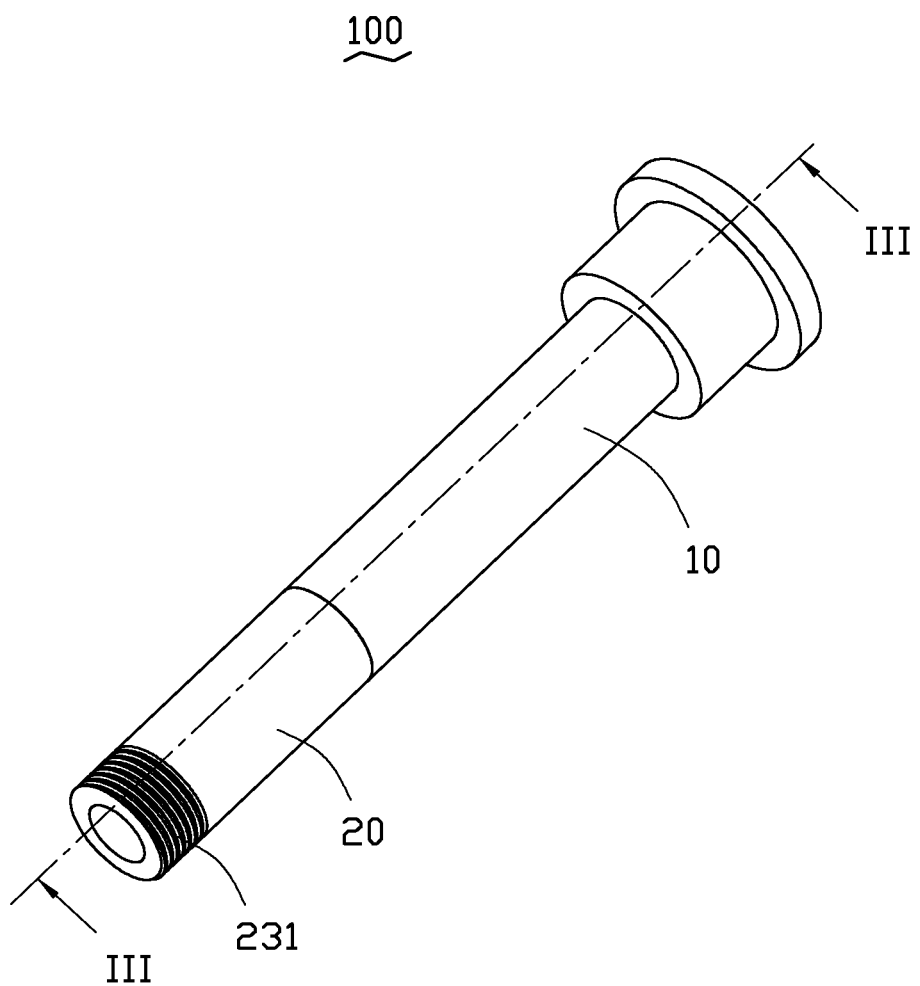
FIG. 1 is an isometric view of a detachable threaded rod in accordance with an exemplary embodiment.
Figure 2:
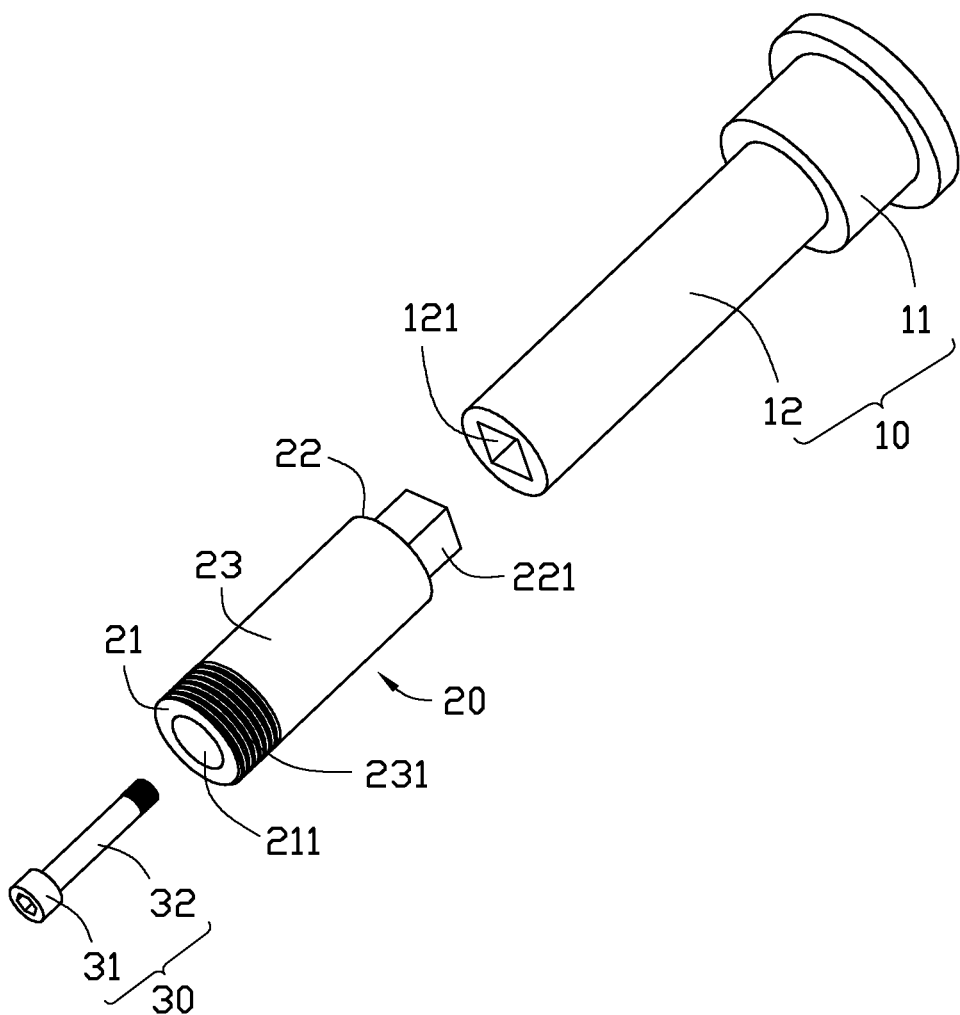
FIG. 2 is an exploded view of the detachable threaded rod of FIG. 1.
Figure 3:
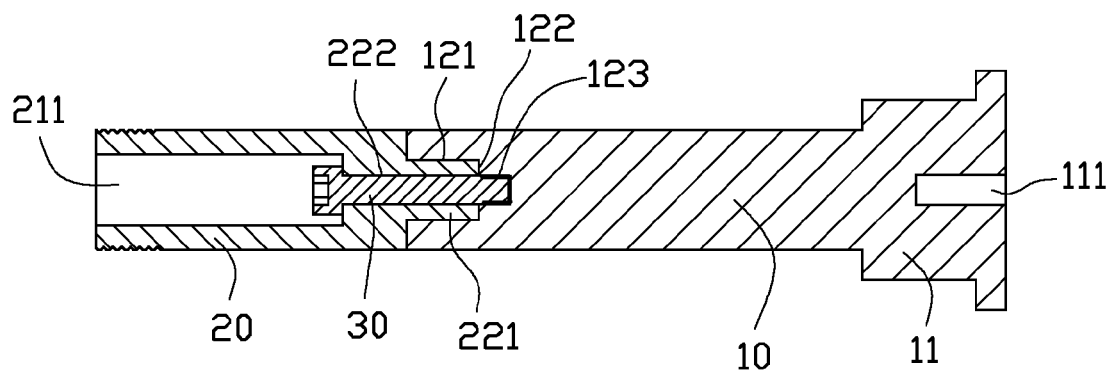
FIG. 3 is a cross-sectional view of the detachable threaded rod taken along a line III-III of FIG. 1.

FIGS. 1-3 show a detachable threaded rod 100, according to an exemplary embodiment. The detachable threaded rod 100 includes an operation portion 10, a molding portion 20, and a screw 30. In this embodiment, the detachable threaded rod 100 is configured for molding internal threads of a workpiece, such as a lens holder (not shown).

The operation portion 10 includes a base 11 and a rod part 12 extending from the base 11. An external diameter of the base 11 is greater than an external diameter of the rod part 12. The base 11 defines a position recess 111 facing away from the rod part 12. The rod part 12 defines a mating hole 121 facing away from the base 11. The mating hole 121 forms a bottom surface 122, which is substantially parallel with an end surface of the rod part 12. The rod part 12 defines a screw hole 123 on the bottom surface 122.

In the embodiment, a cross-section of the mating hole 121 is substantially rectangular. A sectional area of the screw hole 123 is less than a sectional area of the mating hole 121.

The molding portion 20 includes a front end 21, a rear end 22 opposite to the front end 21, and a side surface 23 connected between the front end 21 and the rear end 22. The molding portion 20 defines a cavity 211 on the front end 21. A mating portion 221 extends from the rear end 22 along an extending direction of the molding portion 20. The mating portion 221 defines a through hole 222 facing away from the front end 21. An extending direction of the through hole 222 is substantially parallel with an extending direction of the molding portion 20. The through hole 222 communicates with the cavity 211. The molding portion 20 defines external threads 231 on the side surface 23, generally adjacent to the front end 21.

In the embodiment, a cross-section of the mating portion 221 is a rectangle shaped corresponding to the mating hole 121. A sectional area of the through hole 222 is less than a sectional area of the cavity 211.

The screw 30 includes a screw nut 31 and a threaded rod 32 connected to one end of the screw nut 31. An external diameter of the threaded rod 32 is less than an external diameter of the screw nut 31. The external diameter of the screw nut 31 is less than an internal diameter of the cavity 211 and greater than an internal diameter of the through hole 222.

During assembling, the mating portion 221 of the molding portion 20 is received in the mating hole 121 of the operation portion 10 and touches the bottom surface 122. The screw 30 is received in the cavity 211, and the threaded rod 32 penetrating the through hole 222 and threading with the screw hole 123.

Figure 4:
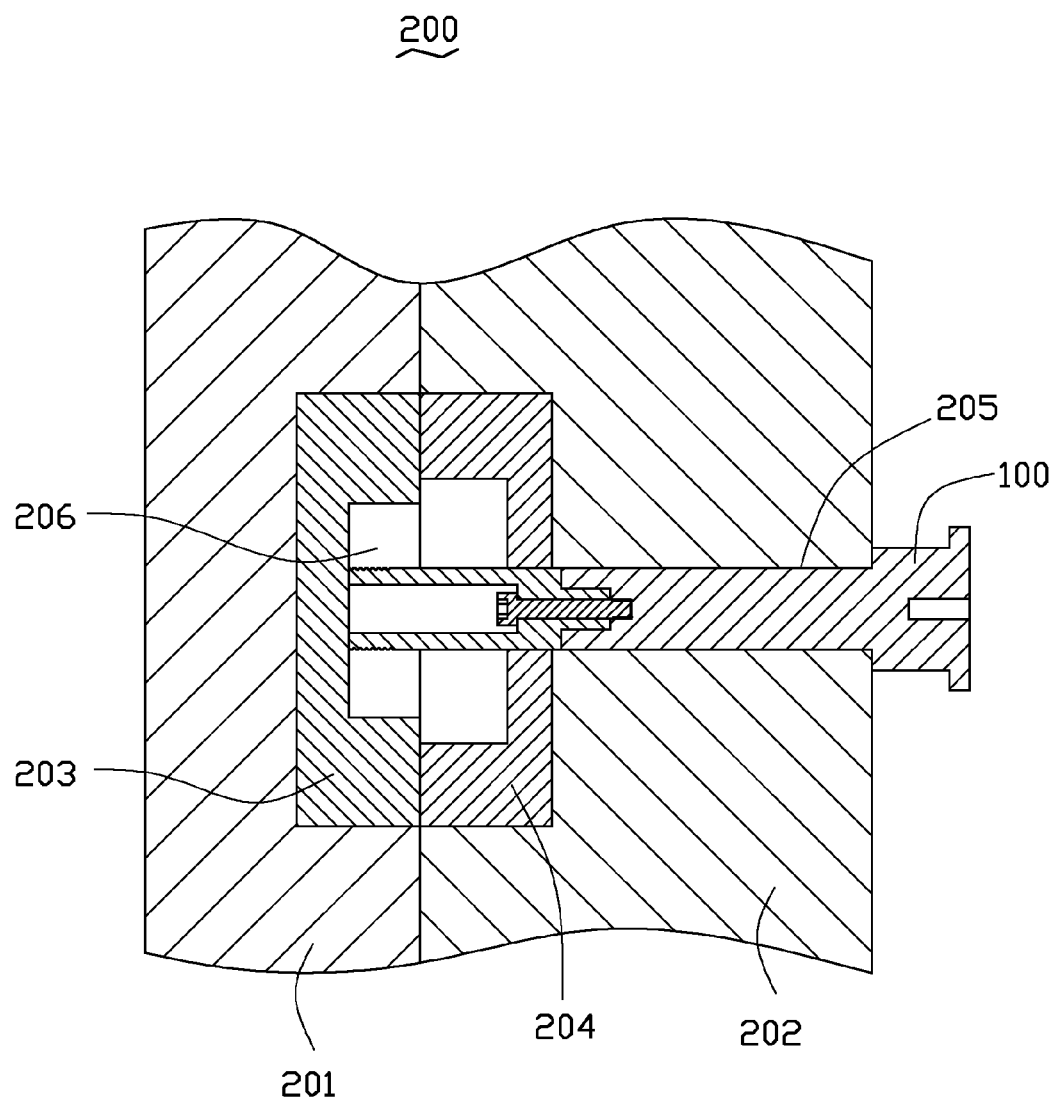
FIG. 4 is a cross-sectional view of an injection mold using the detachable threaded rod of FIG. 1.

FIG. 4 shows an injection mold 200 using the detachable threaded rod 100 according to an exemplary embodiment. The injection mold 200 includes a male mold 201 and a female mold 202 coupled with the male mold 201. The male mold 201 includes a first die 203, and the female mold 202 includes a second die 204. The female mold 202 defines an extending hole 205 penetrating the female mold 202 and the second die 204. The first die 203 and the second die 204 cooperatively define a receiving room 206. The detachable threaded rod 100 penetrates the extending hole 205, and the molding portion 20 is received in the receiving room 206 and resists with the first die 203.

In use, a lot of injection material is injected into the receiving room 206. The external threads 231 of the molding portion 20 contact with the injection material. The detachable threaded rod 100 is rotated by the base 11, after the lens holder is molded in the receiving room 206. When the molding portion 20 is separated from the lens holder, the internal threads couple with the external threads 231 of the inner surface of the lens hole.

When the internal diameter of the lens hole of the lens holder is changed, the user needs to change a detachable threaded rod 100 including the molding portion 20 having an external diameter equaling to the internal diameter of the lens hole. As the molding portion 20 is connected to the operation portion 10 by the screw 30, the user can just change a molding portion 20 corresponding to the lens holder by detaching the screw 30.

Particular embodiments are shown and are described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A detachable threaded rod, comprising:
    an operation portion comprising a rod part, the rod part defining a mating hole and a screw hole on a bottom surface of the mating hole;
    a molding portion comprising a front end, a rear end, and a side surface connected between the front end and the rear end; the molding portion defining a cavity on a front end, the molding portion comprising a mating portion extending from the rear end and received in the mating hole, the mating portion defining a through hole communicating with the cavity; the molding portion defining external threads on the side surface; and
    a screw penetrating the through hole and screwing in the screw hole, the operation portion being fixed with the molding portion by the screw.

2. The detachable threaded rod of claim 1, wherein the screw comprises a screw nut and a threaded rod connected to one end of the screw nut, the screw nut is received in the cavity, and the threaded rod penetrates the through hole and is accommodated in the screw hole.

3. The detachable threaded rod of claim 2, wherein an external diameter of the threaded rod is less than an external diameter of the screw nut, the external diameter of the screw nut is less than an internal diameter of the cavity and greater than an internal diameter of the through hole.

4. The detachable threaded rod of claim 1, wherein the operation portion comprises a base, the rod part extends from one side of the base, and the mating hole faces away from the base.

5. The detachable threaded rod of claim 4, wherein an external diameter of the base is greater than an external diameter of the rod part.

6. The detachable threaded rod of claim 1, wherein a cross-section of the mating hole and a cross-section of the mating portion are both substantially rectangular.

7. The detachable threaded rod of claim 1, wherein an extending direction of the through hole is parallel with an extending direction of the molding portion.

8. The detachable threaded rod of claim 1, wherein the external threads are adjacent to the front end.

9. An injection mold, comprising:
a male mold comprising a first die;
a female mold comprising a second die and defining a extending hole penetrating the second die, the first die and the second die cooperatively defining a receiving room; and
a detachable threaded rod penetrating the extending hole, the detachable threaded rod comprising:
an operation portion comprising a rod part, the rod part defining a mating hole and a screw hole on a bottom surface of the mating hole;
a molding portion received in the receiving room and resisting against the first die, the molding portion comprising a front end, a rear end, and a side surface connected between the front end and the rear end; the molding portion defining a cavity on a front end, the molding portion comprising a mating portion extending from the rear end and received in the mating hole, the mating portion defining a through hole communicating with the cavity; the molding portion defining external threads on the side surface; and
a screw penetrating the through hole and screwing in the screw hole, the operation portion being fixed with the molding portion by the screw.

* * * * *